Patented Nov. 30, 1943

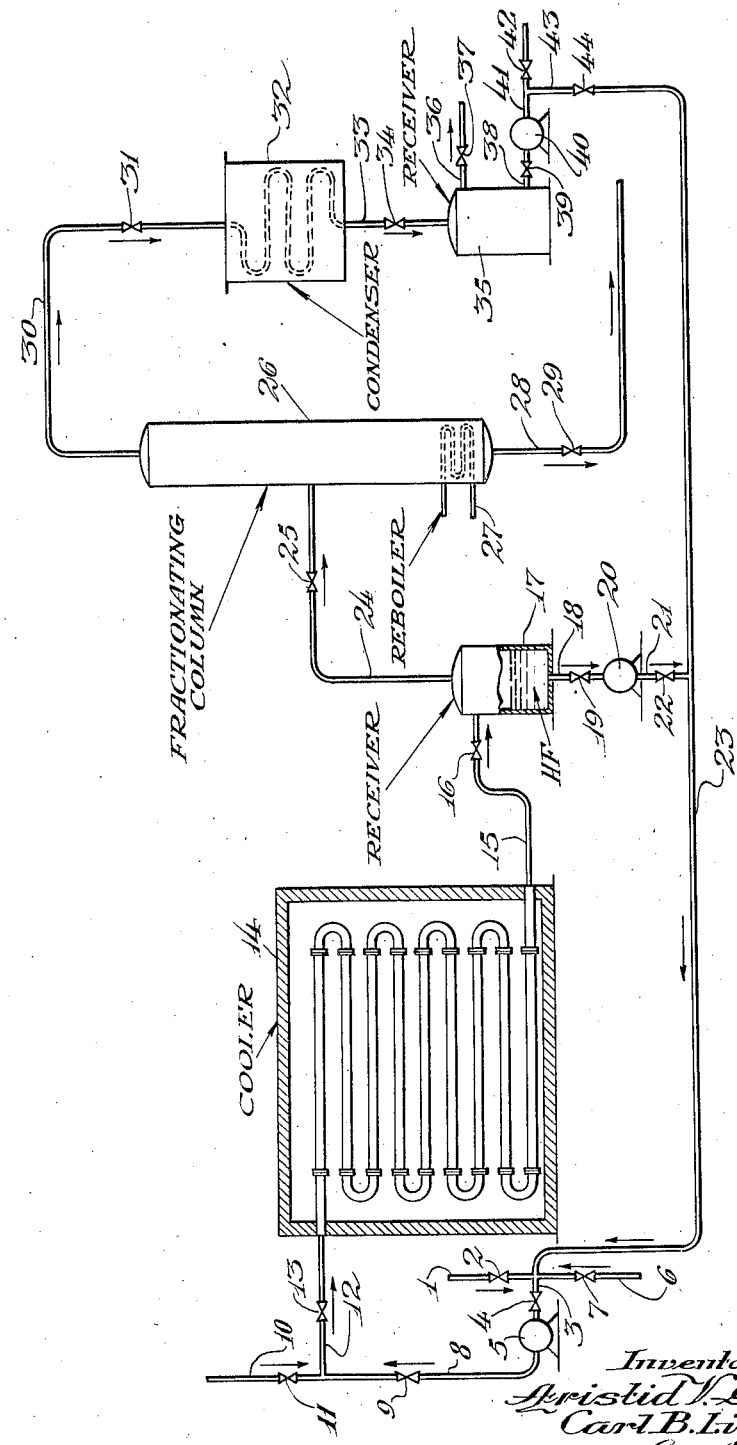

2,335,507

UNITED STATES PATENT OFFICE 2,335,507

ALKYLATION OF PARAFFIN HYDROCARBONS

Aristid V. Grosse, Bronxville, N. Y., and Carl B. Linn, Chicago, Ill., assignors to Universal Oil Products Company, Chicago, Ill., a corporation of Delaware Application November 17, 1941, Serial No. 419,386

6 Claims. (Cl. 260—683.4)

This application is a continuation-in-part of our co-pending application Serial No. 248,777, filed December 31, 1938, now Patent No. 2,267,730, granted December 30, 1941.

This invention is more particularly concerned with the interaction of isomeric or branched chain paraffin hydrocarbons and mono-olefinic hydrocarbons in the presence of catalysts.

It is more specifically concerned with a simple and easily regulated process involving the use of a liquid catalyst which is only slightly altered in the course of the reactions and which catalyzes the desired reactions with a maximum of efficiency.

Processes for the formation of higher molecular weight branched chain hydrocarbons from essentially straight chain compounds or less highly branched compounds are of present importance from the standpoint of the motor fuel industry which demands increasing quantities of isoparaffins within the boiling range of gasoline and particularly iso-octanes, such as, for example, the 2,2,4-trimethyl pentane which forms the standard of reference in rating the anti-knock value of gasolines. Considerable quantities of butanes and butenes are available as by-products from the cracking of petroleum fractions to produce relatively high primary yields of gasoline and by proper segregation of butanes and butenes by solvent extraction and fractionation methods, particularly cuts are available for recombination to produce material yields of the desired iso-octanes. Efforts to alkylate normal butane with butenes in the presence of catalysts have thus far failed unless concurrent isomerization of the normal butanes to isobutane occurs. However, isobutane fractions may be made to interact with butenes and particularly isobutene in the presence of various catalysts to form variable iso-octanes.

Catalysts previously tried to effect the alkylation of isoparaffin hydrocarbons with olefin hydrocarbons include sulfuric acid, phosphoric acid, aluminum chloride, and boron fluoride, all of which have disadvantages which are in a large measure overcome by the use of the catalysts of the present invention. Sulfuric acid, for example, can not be used to effect alkylation with ethylene and gives very poor yields when propylene is used. Furthermore, this acid has a tendency to oxidize hydrocarbons with the formation of sulfur dioxide so that the catalyst is gradually lost by reduction and the products of the reaction are contaminated with sulfur compounds and oxidation products.

Phosphoric acid has a limited application but the reactions are not accelerated to a practical degree unless undesirably high temperatures are employed. Aluminum chloride and similar multivalent metal salts present the usual disadvantages inherent in the use of solid granular catalysts in that the efficiency of the reaction is to some extent contingent on the fineness of subdivision of the catalyst and that recovery of the active salts from their sludges is difficult and expensive. The use of boron fluoride is not practical on account of the cost of this compound.

In one specific embodiment the present invention comprises a process for alkylating isoparaffin hydrocarbons with mono-olefinic hydrocarbons in the presence of liquid hydrogen fluoride under controlled conditions of operation.

We have determined that whereas previous work in alkylating various classes of hydrocarbons with olefins has indicated that the reaction could be brought about in the presence of boron fluoride and minor amounts of hydrogen fluoride, the reactions are better brought about when using merely liquid anhydrous hydrogen fluoride. This catalyst is a liquid boiling at about 20° C. so that it can be used in an apparatus which is cooled to maintain temperatures below this point or can be used at higher temperatures if sufficient pressures are maintained upon the apparatus. By maintaining an excess of isoparaffin at all times, polymerization reactions and the formation of alkyl fluorides are minimized so that the products consists principally of alkylated derivatives of the original isoparaffins. The catalyst is not changed by oxidation or reduction and if lost mechanically it can be readily recovered and re-used while any alkyl fluorides formed are readily decomposable.

In operating the present process, the preferred procedure is to agitate a mixture of liquid hydrogen fluoride and an isoparaffin and gradually introduce a mixture of an olefin and an isoparaffin below the surface of the hydrogen fluoride-isoparaffin mixture. In the batch operation of this process, the agitation may be stopped and the upper hydrocarbon layer fractionated to recover unchanged paraffins and the desired alkylated products. Obviously the process may be made continuous by providing a mixing zone in which sufficient time is given for the completion of the desired reaction followed by a settling zone from which a hydrocarbon layer is withdrawn and fractionated to recover desired alkylated products and paraffin for recycling, while the lower hydrogen fluoride layer is pumped back for further service.

The present process includes the alternative of using hydrogen fluoride generated in situ by the interaction of strong mineral acids such as sulfuric acid with fluorides such as a fluoride of a Group II metal, for example, calcium fluoride, although it will be obvious to those skilled in these types of operations that the preferred procedures outlined for batch and continuous operations respectively will need to be modified somewhat.

For the purpose of illustrating a characteristic apparatus hook-up in which the process may be conducted, the attached drawing shows diagrammatically in general side elevation and by the use of conventional figures an arrangement of interconnected units suitable for continuous operations. It is understood that minor features of apparatus construction may be modified without departing essentially from the generally broad scope of the invention.

Referring to the drawing, liquid isoparaffin hydrocarbons may be introduced through line 1 containing valve 2 to line 3 containing valve 4 leading to pump 5 while liquid hydrogen fluoride is introduced to line 3 by way of line 6 containing valve 7. Pump 5 discharges through line 8 containing valve 9, line 8 receiving a regulated and continuous stream of olefins, or olefins plus isoparaffins, from line 10 containing valve 11, the mixture passing through line 12 containing valve 13 and through a cooler 14 of any suitable construction and capacity for maintaining the temperature of reaction below any desired level while at the same time permitting time for the completion of the reactions. The reaction products follow line 15 containing valve 16 to a receiver 17 in which a separation of hydrogen fluoride and hydrocarbons is effected. The hydrogen fluoride is withdrawn from the receiver through a line 18 containing valve 19 and returned by pump 20 which discharges through line 21 containing valve 22 into line 23 leading to the suction side of pump 5 so that the hydrogen-fluoride catalyst is completely recycled.

The hydrocarbon layer in the upper portion of receiver 17 passes through line 24 and valve 25 and enters fractionation column 26 containing a reboiler 27, unconverted low boiling hydrocarbons being removed as overhead while higher boiling alkylated products of the reaction are withdrawn through line 28 containing valve 29 from the bottom of the column.

The overhead products pass through line 30 containing valve 31 through condenser 32 and thence through run-down line 33 containing a valve 34 to receiver 35 which has a conventional gas release line 36 containing valve 37 and a liquid draw line 38 containing valve 39 leading to a pump 40 which discharges through line 41 containing valve 42 to storage if desired, but ordinarily through line 43 containing valve 44 and leading to line 23 to permit the further alkylation of the paraffin.

The exact temperatures and pressures which should be employed when alkylating various isoparaffins with various olefins will depend upon the activity and physical characteristics of the hydrocarbons involved so that best results will be obtained when conditions are first determined in small scale apparatus. As a rule, excessive elevated temperatures are not necessary or desirable and only sufficient pressures should be used to prevent excessive evaporation of the catalyst or the hydrocarbons.

For the recovery for re-use of hydrogen fluoride which may combine with olefins to form alkyl fluorides in the course of the alkylating reactions, these fluorides may be passed over granular fluorides such as calcium fluoride or aluminum fluorides which decomposes them into hydrogen fluoride and the corresponding olefins. The mixture of olefin and hydrogen fluoride is then passed over solid granular sodium or potassium fluoride which forms addition compounds of the type $NaF \cdot HF$. The olefin liberated may be recycled for further use and the hydrogen fluoride recovered from the double salt by heating.

The following experimental data is given by way of example to indicate the results obtainable when utilizing the present process for alkylating isobutane with butenes to form isooctanes. This example has been chosen because of its commercial importance and it is not to be inferred that the scope of the invention is limited in exact correspondence with the data presented.

*Concentration of hydrogen fluoride*

To determine whether the anhydrous material and the water solutions of hydrogen fluoride could be used interchangeably or with substantially equivalent effects, tests were conducted using 100% anhydrous material, a 90% aqueous solution, and a 75% aqueous solution. An approximately molal equivalent mixture of isobutane and isobutene was passed into the acids of varying concentration at temperatures from 20–30° C., the runs being made in a continuously stirred pressure autoclave. Using 100% anhydrous hydrogen fluoride, the recovered hydrocarbon layer consisted of 50–60% octanes of which about half was 2,2,4-trimethyl pentane. The hydrocarbon layer was completely saturated and contained only 0.1% of fluorine. With the 90% aqueous solution and a molal ratio of paraffin to olefin of 1.5:1, the hydrocarbon layer consisted of 48% octanes and there was present 1% of fluorine. With a 75% acid solution, an equivalent molal ratio of paraffin to olefin and a temperature of 12° C., no alkylation occurred, but there was considerable formation of butyl fluorides, isobutenes forming tertiary butyl fluorides and normal butenes forming secondary butyl fluorides.

*Effect of temperature*

Using a mixture of isobutane and isobutene in a molal ratio of 1.5:1 and 100% hydrogen fluoride, best results were obtained at room temperature. At temperatures within the range of −50 to −60° C., no alkylation occurred, but there was considerable polymerization of isobutene. The hydrocarbon layer contained 2% fluorine. At a temperature of +90° C. utilizing sufficient pressure to maintain liquid phase and with a paraffin-olefin ratio of 1:3, the hydrocarbon products consisted of only 20% octanes and a large amount of more highly alkylated derivatives. Temperatures as high as 100° C. may be used, if desired, by suitable adjustment of time factor, olefin-paraffin ratio, and amount of catalyst used.

*Effect of paraffin-olefin ratio*

Using a molal ratio of paraffin to olefin of 3:1, temperatures from 20–30° C. and 100% hydrogen fluoride, 65% of hydrocarbon product boiled within the octane range and 50% of this material was 2,2,4-trimethylpentane. The percentage of fluorine in the total hydrocarbon products was 0.1%. Using a paraffin-olefin ratio of 1:3 and the same temperature and other operating conditions, 50% of the hydrocarbon products boiled above 200° C. and contained 5–10% olefin polymers indicating that over-alkylation and polymerization had both taken place.

Effect of contact time

This factor was found to vary with the temperature employed and the reactivity of various isoparaffins and olefins which may be brought together.

We claim as our invention:

1. A process for synthesizing hydrocarbons which comprises reacting an isoparaffin with an olefin in the presence of an alkylating catalyst consisting essentially of hydrogen fluoride as its active ingredient, said hydrogen fluoride being generated in situ by interaction of a strong mineral acid with a fluoride under conditions suitable for generating hydrogen fluoride and for alkylating said isoparaffin.

2. A process for synthesizing hydrocarbons which comprises reacting an isoparaffin with an olefin in the presence of an alkylating catalyst consisting essentially of hydrogen fluoride as its active ingredient, said hydrogen fluoride being generated in situ by interaction of sulfuric acid with a fluoride of a metal under conditions suitable for generating hydrogen fluoride and for alkylating said isoparaffin.

3. A process for synthesizing hydrocarbons which comprises reacting an isoparaffin with an olefin in the presence of an alkylating catalyst consisting essentially of hydrogen fluoride as its active ingredient, said hydrogen fluoride being generated in situ by interaction of sulfuric acid with a fluoride of a Group II metal under conditions suitable for generating hydrogen fluoride and for alkylating said isoparaffin.

4. A process for synthesizing hydrocarbons which comprises reacting an isoparaffin with an olefin in the presence of an alkylating catalyst consisting essentially of hydrogen fluoride as its active ingredient, said hydrogen fluoride being generated in situ by interaction of sulfuric acid with calcium fluoride under conditions suitable for generating hydrogen fluoride and for alkylating said isoparaffin.

5. A process for synthesizing hydrocarbons which comprises reacting an isoparaffin with an olefin in the presence of an alkylating catalyst consisting essentially of hydrogen fluoride as its active ingredient, said hydrogen fluoride being generated in situ by interaction of sulfuric acid with calcium fluoride at a temperature between about 20° and about 100° C. under a pressure sufficient to maintain in substantially liquid phase a substantial proportion of the hydrocarbons and hydrogen fluoride.

6. A process for synthesizing hydrocarbons which comprises reacting isobutane with a normally gaseous olefin in the presence of an alkylating catalyst consisting essentially of hydrogen fluoride as its active ingredient, said hydrogen fluoride being generated in situ by interaction of sulfuric acid with calcium fluoride at a temperature between about 20° and about 100° C. under a pressure sufficient to maintain in substantially liquid phase a substantial proportion of the hydrocarbons and hydrogen fluoride.

ARISTID V. GROSSE.
CARL B. LINN.